J. B. TINKER.
MOWING-MACHINE.

No. 174,098. Patented Feb. 29, 1876.

Witnesses,
Wm. S. Grosvenor,
F. P. Stiker

Inventor,
John B. Tinker.
By James Sangster
Attorney

UNITED STATES PATENT OFFICE.

JOHN B. TINKER, OF PLYMOUTH, ASSIGNOR OF ONE-HALF HIS RIGHT TO HENRY J. PETTIBONE, OF BUFFALO, NEW YORK.

IMPROVEMENT IN MOWING-MACHINES.

Specification forming part of Letters Patent No. 174,098, dated February 29, 1876; application filed June 7, 1875.

*To all whom it may concern:*

Be it known that I, JOHN B. TINKER, of Plymouth, in the county of Chenango and State of New York, have invented a new and useful Improvement in Center-Draft Mowing-Machines, which improvement is fully set forth in the following specification, reference being had to the accompanying drawings:

This invention relates to certain improvements in mowing machines, for which Letters Patent were granted to me, No. 51,364, dated December 5, 1865; and it consists of a jointed finger-bar shoe, having the joint arranged in the direction of its length, or nearly so, so that the end of the main brace will pass through the joint opening and be securely held in position by a side brace, which also serves as a nut that cannot get loose or out of place.

The object of the invention is to provide a simple and efficient means for firmly holding the finger-bar and leaving it so it can be easily lifted up from the ground while passing over a stone or other obstruction, and so that it will conform readily to the inequalities of the ground over which it passes.

Figure 1:
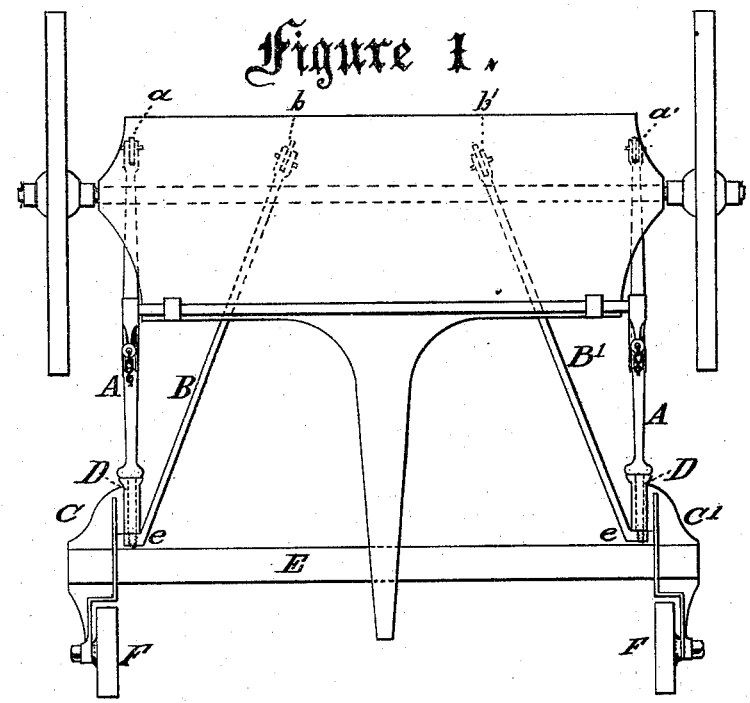
Figure 2:
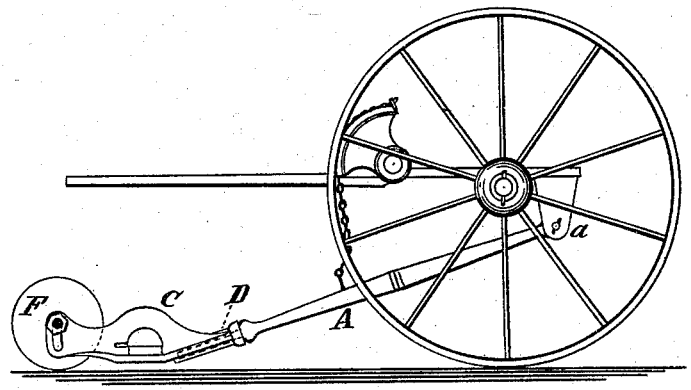

In said drawings, Figure 1 is a plan or top view of the machine, and Fig. 2 a side elevation.

A represents the main braces of the machine, of which there are two. They are jointed to the machine at $a$ $a'$. B B' are the side braces, which are also jointed to the machine at $b$ $b'$. The lower ends of the braces A pass into the shoes C C', as shown by the dotted lines D, and are screwed into the nuts $e$ $e$, forming parts of the braces B B', after which they are secured at $b$ $b'$, as above mentioned, thereby forming a permanent joint, which is simple, easily made, and not liable to get out of order. E represents the finger-bar, and F the carrying-rollers. They are constructed in the usual manner, but as these and some other parts of the machinery are substantially as shown in my aforesaid patent, they need not be described here.

I claim as my invention—

The shoe C, jointed to the brace A, as shown, in combination with the brace B, substantially as and for the purposes specified.

J. B. TINKER.

Witnesses:
J. SANGSTER,
H. J. PETTIBONE.